(12) United States Patent
Humann

(10) Patent No.: US 11,740,593 B2
(45) Date of Patent: Aug. 29, 2023

(54) EXPERT SYSTEM FOR CONTROLLING LOCAL ENVIRONMENT BASED ON RADIANCE MAP OF SKY

(71) Applicant: Halio, Inc., Hayward, CA (US)

(72) Inventor: Christian Humann, Berkeley, CA (US)

(73) Assignee: Halio, Inc., Hayward, CA (US)

( * ) Notice: Subject to any disclaimer, the term of this patent is extended or adjusted under 35 U.S.C. 154(b) by 526 days.

(21) Appl. No.: 16/804,370

(22) Filed: Feb. 28, 2020

(65) Prior Publication Data

US 2020/0272111 A1 Aug. 27, 2020

Related U.S. Application Data

(63) Continuation of application No. 15/225,047, filed on Aug. 1, 2016, now Pat. No. 10,579,024, which is a
(Continued)

(51) Int. Cl.
*F24F 11/30* (2018.01)
*G05B 13/02* (2006.01)
(Continued)

(52) U.S. Cl.
CPC ............ *G05B 13/028* (2013.01); *F24F 11/30* (2018.01); *F24F 11/46* (2018.01); *F24F 11/62* (2018.01);
(Continued)

(58) Field of Classification Search
None
See application file for complete search history.

(56) References Cited

U.S. PATENT DOCUMENTS

| 5,572,635 A | 11/1996 | Takizawa et al. |
| 5,663,621 A | 9/1997 | Popat |

(Continued)

FOREIGN PATENT DOCUMENTS

| CN | 101849435 A | 9/2010 |
| CN | 102361328 A | 2/2012 |

(Continued)

OTHER PUBLICATIONS

Pfister et al. 'Cloud Coverage Based on All-Sky Imaging and Its Impacton Surface Solar Irradiance' J. Appl. Meteor., vol. 42 pp. 1421-1434, American Meteorological Society, 2003.*

(Continued)

*Primary Examiner* — Bernard G Lindsay
(74) *Attorney, Agent, or Firm* — Lowenstein Sandler LLP

(57) ABSTRACT

Disclosed is a system, method, and computer program product that employs high dynamic range (HDR) image processing and manipulation algorithms for capturing and measuring real-time sky conditions for processing into control input signals to a building's automated fenestration (AF) system, daylight harvesting (DH) system and HVAC system. The photometer comprises a color camera and a fitted fish-eye lens to capture 360-degree, hemispherical, low dynamic range (LDR) color images of the sky. Both camera and lens are housed in a sealed enclosure protecting them from environmental elements and conditions. In some embodiments the camera and processes are controlled and implemented by a back-end computer.

19 Claims, 6 Drawing Sheets

Related U.S. Application Data continuation-in-part of application No. 13/798,050, filed on Mar. 12, 2013, now Pat. No. 9,406,028.

(60) Provisional application No. 61/696,052, filed on Aug. 31, 2012.

(51) Int. Cl.

| | | |
|---|---|---|
| *G06N 5/04* | (2023.01) | |
| *G06N 20/00* | (2019.01) | |
| *F24F 11/62* | (2018.01) | |
| *F24F 11/46* | (2018.01) | |
| *F24F 11/63* | (2018.01) | |
| *G06N 5/046* | (2023.01) | |
| *F24F 130/20* | (2018.01) | |
| *F24F 110/00* | (2018.01) | |
| *F24F 11/65* | (2018.01) | |
| *F24F 130/10* | (2018.01) | |
| *F24F 130/00* | (2018.01) | |

(52) U.S. Cl.
CPC .............. *F24F 11/63* (2018.01); *G05B 13/02* (2013.01); *G06N 5/04* (2013.01); *G06N 20/00* (2019.01); *F24F 11/65* (2018.01); *F24F 2110/00* (2018.01); *F24F 2130/00* (2018.01); *F24F 2130/10* (2018.01); *F24F 2130/20* (2018.01); *G06N 5/046* (2013.01)

(56) References Cited

U.S. PATENT DOCUMENTS

| | | |
|---|---|---|
| 6,817,399 B2 | 11/2004 | Berman et al. |
| 7,417,397 B2 | 8/2008 | Berman et al. |
| 7,625,151 B2 | 12/2009 | Li et al. |
| 7,684,022 B2 | 3/2010 | Berman et al. |
| 7,977,904 B2 | 7/2011 | Berman et al. |
| 8,016,016 B2 | 9/2011 | Berman et al. |
| 8,120,292 B2 | 2/2012 | Berman et al. |
| 8,125,172 B2 | 2/2012 | Berman et al. |
| 8,248,014 B2 | 8/2012 | Berman et al. |
| 8,276,642 B2 | 10/2012 | Berman et al. |
| 8,319,956 B2 | 11/2012 | Berman et al. |
| 8,432,117 B2 | 4/2013 | Berman et al. |
| 8,482,724 B2 | 7/2013 | Berman et al. |
| 8,525,462 B2 | 9/2013 | Berman et al. |
| 8,587,242 B2 | 11/2013 | Berman et al. |
| 9,137,463 B2 | 9/2015 | Gilboa et al. |
| 9,406,028 B2 | 8/2016 | Humann |
| 2004/0169770 A1* | 9/2004 | Widener ............ H04N 5/23206 348/E5.025 |
| 2005/0110416 A1* | 5/2005 | Veskovic .................. E06B 9/68 315/149 |
| 2007/0253768 A1 | 11/2007 | Li et al. |
| 2007/0291252 A1 | 12/2007 | Berman et al. |
| 2009/0020233 A1 | 1/2009 | Berman et al. |
| 2009/0222137 A1 | 9/2009 | Berman et al. |
| 2009/0254222 A1 | 10/2009 | Berman et al. |
| 2010/0116443 A1 | 5/2010 | Berman et al. |
| 2010/0157427 A1 | 6/2010 | Berman et al. |
| 2010/0198420 A1 | 8/2010 | Rettger et al. |
| 2010/0294440 A1 | 11/2010 | Li et al. |
| 2010/0309330 A1* | 12/2010 | Beck ....................... G01W 1/10 348/222.1 |
| 2011/0164304 A1* | 7/2011 | Brown ...................... E06B 9/66 359/275 |
| 2011/0220091 A1 | 9/2011 | Kroyzer |
| 2011/0290432 A1 | 12/2011 | Berman et al. |
| 2012/0126737 A1 | 5/2012 | Berman et al. |
| 2012/0133315 A1 | 5/2012 | Berman et al. |
| 2012/0143356 A1 | 6/2012 | Berg-Sonne et al. |
| 2012/0155704 A1 | 6/2012 | Williams et al. |
| 2012/0201456 A1 | 8/2012 | El-Mahdy et al. |
| 2012/0262600 A1* | 10/2012 | Velarde ................ H04N 23/741 348/223.1 |
| 2012/0285630 A1 | 11/2012 | Berman et al. |
| 2013/0054662 A1 | 2/2013 | Coimbra |
| 2013/0057937 A1 | 3/2013 | Berman et al. |
| 2013/0063065 A1 | 3/2013 | Berman et al. |
| 2013/0081767 A1 | 4/2013 | Berman et al. |
| 2013/0088463 A1* | 4/2013 | Kim ..................... G06V 10/141 345/179 |
| 2013/0180676 A1 | 7/2013 | Berman et al. |
| 2013/0258068 A1* | 10/2013 | Schmidt ............ H01L 31/02021 348/143 |
| 2014/0067733 A1 | 3/2014 | Humann |
| 2015/0116453 A1* | 4/2015 | Hirata .................. H04N 5/2628 348/38 |

FOREIGN PATENT DOCUMENTS

| | | |
|---|---|---|
| WO | 2011129473 A1 | 10/2011 |
| WO | 2012005461 A2 | 1/2012 |
| WO | 2014036559 A1 | 3/2014 |

OTHER PUBLICATIONS

Wienold et al. 'Evaluation methods and development of a new glare prediction model for daylight environments with the use of CCD cameras' Energy and Buildings 38 (2006) 743-757, Elsevier, 2006.*

Arnal et al. 'Consideration of glare from daylight in the control of the luminous atmosphere in buildings' 2011 IEEE/ASME International Conference on Advanced Intelligent Mechatronics (AIM2011) Jul. 3-7, 2011.*

Extended European Search Report for European Patent Application No. 13833226.7 dated May 9, 2016.

Fairchild, et al., "Brightness, Lightness, and Specifying Color in High-Dynamic-Range Scenes and Images", SPIE Proceedings, vol. 7867, Image Quality and System Performance VIII, Jan. 24, 2011, pp. 1-14.

Ardeshir Mahdavi et al., "Elements of a Simulation-Assisted Daylight-Responsive Illumination Systems Control in Buildings", Building Simulation 20005, Ninth International IBPSA Conference, pp. 693-700, Montreal, Canada, Aug. 15-18, 2005.

Bojana Spasojevic et al., "Sky Luminance Mapping for Computational Daylight Modeling", Building Simulation 2005, Ninth International IBPSA Conference, pp. 1163-1169, Montreal, Canada, Aug. 15-18, 2005.

"President Obama Visits Solar Power Plant Using Technology Developed by UC San Diego Engineers", published Mar. 21, 2012 [online] and retrieved from http://www.jacobsschool.ucsd.edu/news/news_releases/release.sfe?id=1184> on Jan. 9, 2014.

Long, C.N., J.M. Sabburg, J. Calbo and D. Pages, 2006: Retrieving Cloud Characteristics from Ground-Based Daytime Color All-Sky Images. J.Atmos. Oceanic Technol, 23, 633-652, vol. 23, May 2006.

Tregenza PR. 1987, Subdivision of the Sky Hemisphere for Luminance Measurements. Lighting Research and Technology. vol. 19:13-14.

Perez, R. Ineichen, P. and Seals, R. (1990) Modeling Daylight Availability and Irradiance Components from Direct and Global Irradiance. Solar Energy 44, 271-89.

PCT International Search Report and Written Opinion for International Application No. PCT/US13/57849 dated Dec. 12, 2013, 9 pages.

Office Action from SIPO dated Nov. 2016, in Chinese.
English Lanuage Abstract for CN102361328A.

* cited by examiner

EXPERT SYSTEM FOR CONTROLLING LOCAL ENVIRONMENT BASED ON RADIANCE MAP OF SKY

CROSS REFERENCE TO RELATED APPLICATIONS

This application is a continuation of U.S. patent application Ser. No. 15/225,047, filed Aug. 1, 2016, now U.S. Pat. No. 10,579,024, issued Mar. 3, 2020, which is a continuation-in-part of U.S. patent application Ser. No. 13/798,050, filed Mar. 12, 2013, now U.S. Pat. No. 9,406,028, issued Aug. 2, 2016, which that claims benefit of U.S. application No. 61/696,052 filed Aug. 31, 2012, the contents of which is hereby expressly incorporated in its entirety for all purposes.

BACKGROUND OF THE INVENTION

The present invention relates generally to a building automation control system, and more specifically, but not exclusively, to use of a high dynamic range (HDR) sky map for predictive control.

This disclosure relates to a photometric device controlled wirelessly or directly by a microcontroller and/or a back-end computer system to control a building's automated daylighting fenestration system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It has been determined that the use of daylight harvesting (DH) to replace or supplement electric lighting in buildings can result in significant energy and demand savings as well as improve comfort and visual performance. For example, DH may be accomplished using lighting control systems that are able to dim or switch electric lighting in response to changing daylight availability. High performance fenestration systems are a necessary element of any successful daylighting design that aims to reduce lighting energy use. New fenestration technologies have been developed that aim at controlling the intensity of the incoming solar radiation, its interior distribution and its spectral composition, as well as thermal losses and gains. For best performance these fenestration systems often incorporate automated components such as, but not limited to, shades, Venetian blinds, interior/exterior fixed and adjustable louvers, electrochromic glazings, and optical components (i.e., light redirecting devices) in order to respond to the dynamic nature of daylight and its component parts of direct sun, diffuse sky and exterior objects reflecting on to the fenestration. These controls are with respect to openings or portals in a building or wall envelope, such as for windows, doors, louvers, vents, wall panels, skylights, storefronts, curtain walls, and slope glazed systems.

Automated fenestration (AF) systems use a combination of photometers, pyranometers, and computer algorithms to measure and predict real time sun and sky conditions in order to control how these systems modulate natural daylight illumination in the interior spaces of buildings while preventing glare, heat-gain and brightness discomfort for the building's occupants. Current fenestration control systems, like SolarTrac by MechoSystems, employ an array of exterior mounted pyranometers and photometers to measure sky conditions and sky brightness' from a building's roof top as well as from specific façade orientations (e.g. north, east, south, west). The measured irradiance values from the roof are compared against published theoretical values for specific latitudes to determine if the sky condition is clear or overcast. When the sky is overcast the shades are raised. When clear the system adjusts the shades of each fenestration orientation according to the solar geometry for that orientation and the desired depth of direct sun allowed to enter in to the space. The photometric values of sky brightness, measured vertically from discrete façade orientations, are compared against specified luminance levels to determine if shades need to be closed for control of visual and thermal comfort.

Unfortunately these systems require multiple pyranometers and photometers, each capable of taking only very specific measurements (i.e. irradiation or illuminance) of only the global component of the sky (i.e. the diffuse sky and solar contribution are measured together). Without the ability to sample the sky directionally and discreetly clouds cannot be discerned from the clear sky component to determine such metrics as amount of cloud coverage, cloud size and brokenness of cloud coverage and the amount of direct, solar diffusion caused by the cloud. These measurements are necessary for approximating and predicting if, when, and for how long the sun is or may be occluded by clouds. Without the latter capabilities, AF systems tend to either not react in time, or to overreact when control is or is not needed.

Additionally, the façade mounted photometers inability to separately measure the direct solar component and diffuse sky component at different facade orientations impedes their ability to control for glare and direct solar gain. The effects of these two components on visual glare and thermal gain are different, requiring each to be measured separately. Sun hitting a photometer at an angle to its receiving surface's orientation will cause a high photometric reading, but may not be a source of glare if the angle is such that the circumsolar region is out of the visual field of the occupants. In contrast, a relatively lower photometric reading of a bright, overcast sky in the visual field of building occupants may be high enough to be a source of visual discomfort.

Furthermore, the integration of photometers and pyranometers with fenestration systems is costly and complicated limiting its market share and the benefits associated with it.

What is needed is a system and method for measurement and accurate prediction of sky/weather influence on building systems that respond to local sky-related environment changes.

BRIEF SUMMARY OF THE INVENTION

Disclosed is a system and method for a system and method for measurement and accurate prediction of sky/weather influence on building systems that respond to local sky-related environment changes.

The following summary of the invention is provided to facilitate an understanding of some of the technical features related to predictive building automation control systems, and is not intended to be a full description of the present invention. A full appreciation of the various aspects of the invention can be gained by taking the entire specification, claims, drawings, and abstract as a whole. The present invention is applicable to other sky-influenced predictive control systems, as well as other environments such as indoor and outdoor lighting systems.

An apparatus including an HDR capturer for obtaining an image of a local environment; a mapper for processing said image to extract a plurality of metrics and performance data of said local environment; and an expert learning system, responsive to said plurality of metrics and performance data to generate a near real-time prediction of a local change in said local environment and initiating a change in a local-environment-influencing system to counter said local change.

A computer-implemented method, including a) producing an HDR image for a local environment; b) extracting, using a computing system, a plurality of metrics and performance data of said local environment from said HDR image; and c) predicting, using said computing system, a local change in said local environment responsive to said plurality of metrics and performance data of said local environment from said HDR image.

An embodiment of the present invention may include multiple HDR capturers for obtaining images of a local environment. A mapper may process these images to extract a plurality of metrics and performance data of said local environment; and an expert learning system, responsive to said plurality of metrics and performance data to generate a near real-time prediction of a local change in said local environment and initiating a change in a local-environment-influencing system to counter said local change.

An apparatus including an HDR (high dynamic range) capturer configured to obtain an image of a local environment, the HDR capturer including at least a pair of horizontally arranged HDR imagers each having a field-of-view wherein the field-of-view of each the HDR imager is non-aligned with at least one other field-of-view of the at least the pair of imagers; a mapper processing the image and extracting a plurality of metrics and performance data of the local environment; and an expert learning system, responsive to the plurality of metrics and performance data generating a near real-time prediction of a local change in the local environment and initiating a change in a local-environment-influencing system to counter the local change.

A computer-implemented method, including a) producing an HDR (high dynamic range) image for a local environment, the HDR image produced from an HDR capturer including at least a pair of horizontally arranged HDR imagers each having a field-of-view wherein the field-of-view of each the HDR imager is non-aligned with at least one other field-of-view of the at least the pair of imagers; b) extracting, using a computing system, a plurality of metrics and performance data of the local environment from the HDR image; and c) predicting, using the computing system, a predicted local change in the local environment responsive to the plurality of metrics and performance data of the local environment from the HDR image, wherein the predicted local change is in advance of an actual local change in the local environment wherein the steps a)-c) are included in a control system for a building, wherein the building includes an automated climate control responsive to the control system, and wherein the predicted local change is processed into control signals for the control system which operates the automated climate control to reduce a magnitude of the actual local change or a rate of change of the actual local change.

An apparatus including an HDR (high dynamic range) capturer configured to obtain an image of a local environment, the HDR capturer including at least a pair of horizontally arranged HDR imagers each having a field-of-view wherein the field-of-view of each the HDR imager is non-aligned with at least one other field-of-view of the at least the pair of imagers; a mapper processing the image and extracting a plurality of metrics and performance data of the local environment; and an expert learning system, responsive to the plurality of metrics and performance data generating a near real-time assessment of the local environment and initiating a change in a local-environment-influencing system to respond to the assessment.

A computer-implemented method, including a) producing an HDR (high dynamic range) image for a local environment, the HDR image produced from an HDR capturer including at least a pair of horizontally arranged HDR imagers each having a field-of-view wherein the field-of-view of each the HDR imager is non-aligned with at least one other field-of-view of the at least the pair of imagers; b) extracting, using a computing system, a plurality of metrics and performance data of the local environment from the HDR image; and c) assessing, using the computing system, the local environment producing an assessment and initiating a change in a local-environment-influencing system to respond to the assessment.

A computer-implemented method, including a) producing an HDR (high dynamic range) image for a local environment; b) extracting, using a computing system, a plurality of metrics and performance data of the local environment from the HDR image; and c) assessing, using the computing system, the local environment producing an assessment and initiating a change in a local-environment-influencing system to respond to the assessment.

A non-transitory computer readable medium with computer executable instructions stored thereon executed by a processor to perform the method of assessing a local environment, the method comprising: a) producing an HDR (high dynamic range) image for a local environment, the HDR image produced from an HDR capturer including at least a pair of horizontally arranged HDR imagers each having a field-of-view wherein the field-of-view of each the HDR imager is non-aligned with at least one other field-of-view of the at least the pair of imagers; b) extracting, using a computing system, a plurality of metrics and performance data of the local environment from the HDR image; and c) assessing, using the computing system, the local environment producing an assessment and initiating a change in a local-environment-influencing system to respond to the assessment.

As described herein, many embodiments include a predictive element. That is, the systems and methods make a near-real-time assessment of the local environment for controlling a building system, with those control mechanisms tuned for predicting what the local environment will be like some time in the future such as to allow for some of the building automation systems to make advance preparations. Some of the systems require some advance time to efficiently make whatever adaptations and corrections will preferably maintain the building within desired operating parameters. This is a special case of the more generalized process of responding to the local assessment of the local environment as some systems may require little if any lead time. In these cases, an embodiment of the present invention may appear to be more "reactive" than "predictive" but as described herein, the predictions may be considered a near-real-time reaction to the current local environment.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
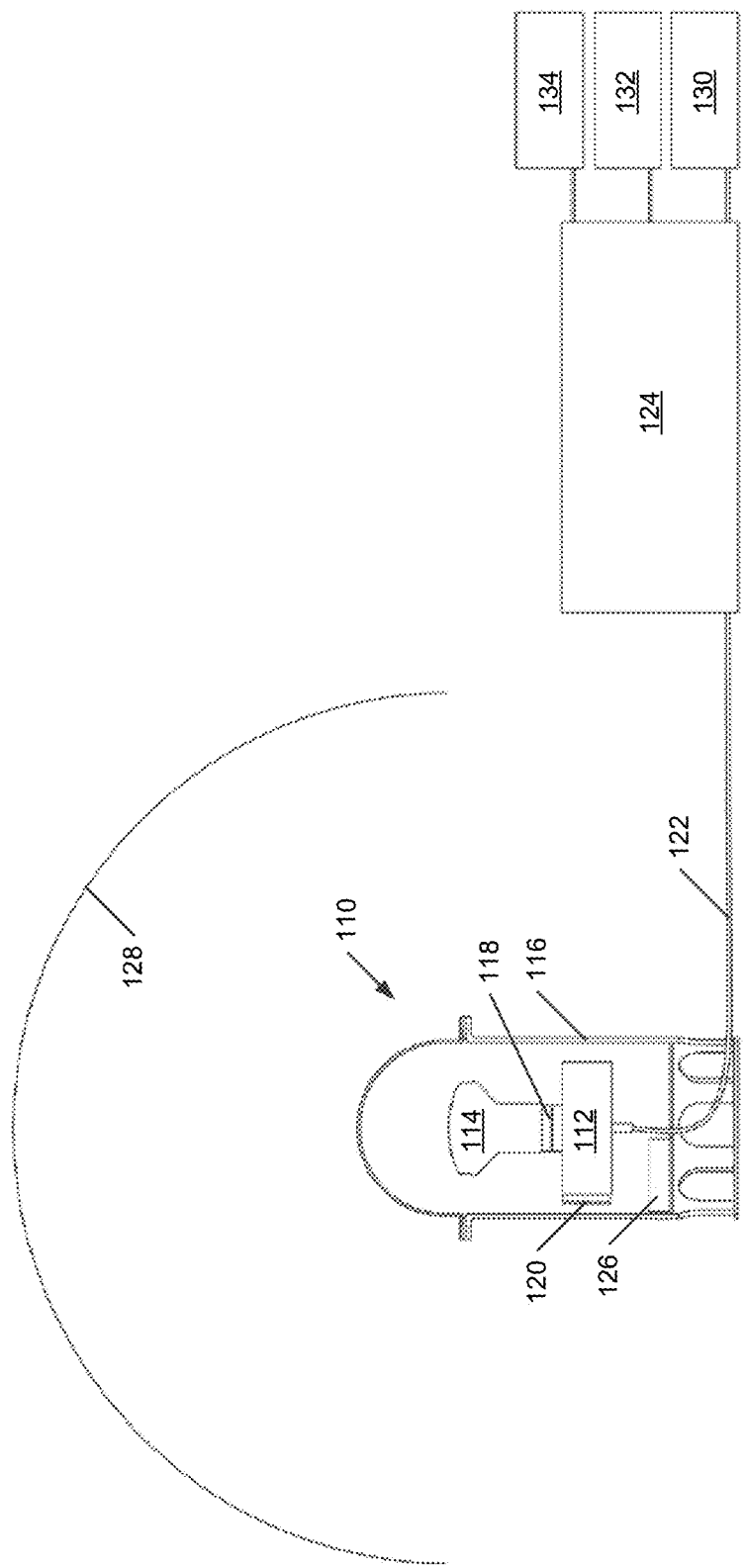
FIG. 1 illustrates an embodiment of a HDR sky mapping system.

Embodiments of the present invention provide a system and method for a system and method for measurement and accurate prediction of sky/weather influence on building systems that respond to local sky-related environment changes. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

One embodiment of the HDR photometer system 110 is illustrated in FIG. 1 (section view). As depicted therein, the broad aspects of the embodiment 110 includes at least one interchangeable camera 112 capable of capturing a sequence of LDR color images (or frames) 214 at different shutter speeds and/or apertures and having a minimum of one circular fish-eye lens 114 capable of providing a 360-degree azimuthal view and 180-degree or more hemispherical view of the sky. The camera 112 and lens 114 are housed in an environmentally protected enclosure 116 so as to permit the camera 112 to capture a 360-degree azimuthal view and 180-degree or more hemispherical view of the sky 128.

The camera 112 is operatively connected 122 to a back-end computer 124 that instructs the camera 112, via software, to capture a sequence of LDR images 214 of the sky 128 at different shutter speeds at a preset interval of time. Typically a sequence of five, exposure and or aperture (F-stop) bracketed images are captured at a rate of one sequence per two minutes but one may reduce this or increase this number of brackets and rate at which they are taken depending on user data needs. The color, exposure bracketed images are transmitted to the computer 124 for processing into a single HDR radiance map 220 of the sky.

The preferred camera 112 used in this invention is a digital camera capable of being controlled and interfaced 122 physically with a computer 124 (e.g. RS-232, USB, IEEE 1394, TCP/IP and GIGE) or wirelessly (e.g. Bluetooth, Wi-Fi, ZigBee and wireless USB or others). However other embodiments may use other camera types such as, but not limited to, digital or analog video cameras where the video signal is outputted via an analog or digital signal to a computer with an appropriate interface board. The signal will then be input into a frame grabber board mounted on a computer (not shown).

In still another embodiment of the present invention a weatherproof camera 112 and lens 114 is employed without the need for an environmentally protected enclosure 116.

In another embodiment of the present invention the camera 112 is cooled and heated directly to maintain the camera's 112 temperature within the manufacturer's recommended operating temperature ranges by attached thermoelectric (e.g., Peltier cooler/heater) modules 118 controlled by a temperature sensor. Other means of cooling and heating the camera may include, but are not limited to, fans, heat sinks, liquid cooling pumps, and small electric heaters.

In still another embodiment of the present invention the camera 112 or lens 114 are fitted with a filter 120 (e.g. Neutral Density filter, Polarizing filter, Near Infrared filter and colored filters). These filters may be used to protect the camera's image senor from the possible harmful effects of the sun and or to enhance specific aspects of the images produced.

In still another embodiment of the present invention the camera 112 is operatively connected 122 to a microprocessor 126 enclosed in the same environmentally protected enclosure 116. The microprocessor 126 takes the place of the back-end computer 124 mentioned previously.

In still another embodiment of the present invention a pyranometer and/or photometer (not shown) are employed. These sensors are attached to or are in close proximity to the environmentally protected enclosure 116 to capture global values of sun and sky irradiation and or illuminance respectively.

Figure 2:
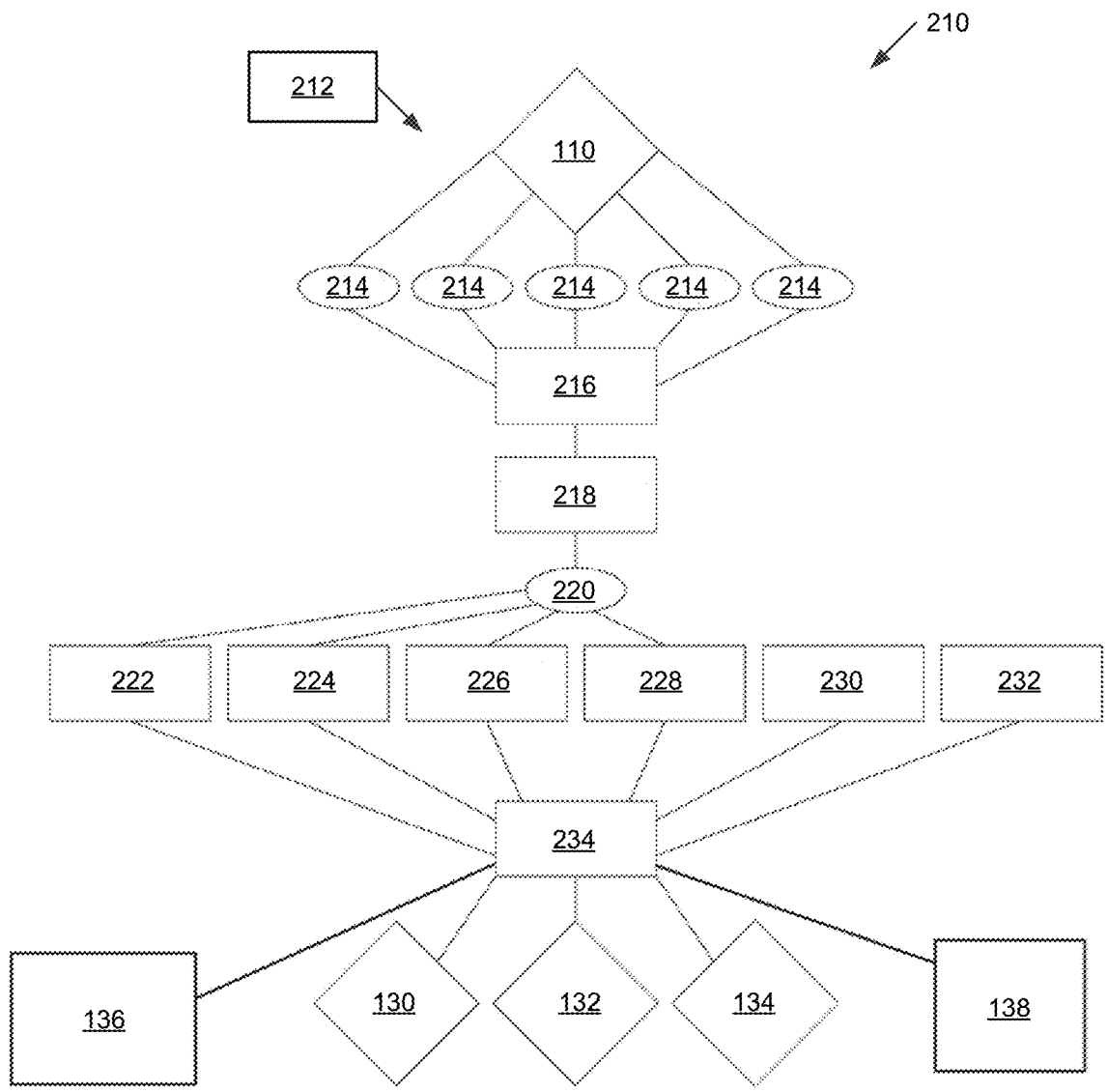
FIG. 2 illustrates a system architecture for an automated control system including environment prediction.

FIG. 2 conceptually illustrates the software architecture 210 employed to control the system 110 as well as the procedures and transformations employed for calculating cloud, sun and sky photometric data that's later processed into control signals sent to the automated fenestration (AF) 130, daylight harvesting (DH) 132 and heating, ventilation, and air conditioning (HVAC) 134 systems. Once triggered by a user-set time interval the camera control software (CCS) 212 instructs the camera 112 to capture a single LDR image 214 at the camera's 112 fastest exposure setting. The captured image is analyzed to determine if the average pixel brightness meets a predetermined, minimum value appropriate for inclusion in the processing of the final HDR radiance map 220. If the image is determined to be too dark then the camera is instructed to capture another image at a lower exposure until a captured image meets the minimum, average pixel brightness. Once an acceptable image is captured more images are acquired, each at sequentially longer exposure times. This embodiment captures 5 LDR images 214, however more or less than this can be captured to meet a user's needs. Also, in some embodiments of the present invention both exposure and or aperture brackets, rather than exposure alone, may be used when capturing the LDR sequence of images. Different CCS 212 may be used for this embodiment including an Astro IIDC program for Apple Computer's operating system OSX by Aupperle Services and Contracting, or FlyCapture SDK program for Linux operating systems by Point Grey Research Inc. However, other camera control programs are available for OSX, Linux, and Windows.

After a sequence of exposure bracketed, LDR images 214 are acquired from the system 110 by computer 124, metadata information EXIF 216 of each LDR image 214 is updated, if necessary, with the exposure speed, camera ISO speed and the lens f-stop setting. Next, an HDR image generator 218 processes the LDR images and EXIF 216 into an HDR radiance map 220 (e.g., a "sky map"). The preferred HDR image processing software used in HDR image generator 218 includes "HDRgen" written by Greg Ward of Exponent Corporation. The pixel data in the HDR radiance map contain real-world luminance values equivalent to those that might be measured using a spot luminance meter. Once processed the HDR radiance map 220 is run through several algorithmic and ray-tracing procedures (e.g., procedure 222-procedure 228) to extract quantitative cloud, sky and solar data. These procedures may include: a radiance map sampling and processing procedure 222, a sky patch and zone generation procedure 224, a cloud filtering and masking procedure 226, and a cloud edge-to-area ratio procedure 228. Procedures 230-232 may be calculated independently from HDR radiance map 220 for determining solar position and global and direct values of horizontal and vertical solar irradiation/illuminance values for the buildings location at the same date and time as the acquisition of LDR images 214. Procedures 230—procedure 232 may include: a solar position procedure 230 and a solar irradiance and illuminance procedure 232.

In procedure 222 the HDR radiance map's 220 pixel values are processed and sampled for calculating the diffuse, horizontal illumination (lux or 1 m/m$^2$) value at the photometer as well as the highest recorded pixel value captured in the solar region of the HDR radiance map. The highest recorded pixel value is divided by the highest achievable senor pixel value, for the particular camera used, in order to provide a reduction and correction factor for use in later procedures such as the calculation of the amount by which the sun's direct beam component is diffused by cloud cover and for global illumination/irradiation predictions.

In procedure 224 the HDR radiance map 220 is subdivided into discreet patches similar to the method described by Tregenza PR. 1987. Subdivision of the sky hemisphere for luminance measurements. Lighting Research and Technology. Vol 19:13-14. These patches are then reassembled to represent specific zones of the sky. The number of zones generated is chosen by the user based on the number of building façade orientations. Each of these reassembled zones contains all the pixel brightness values for within that portion of the sky visible to a building occupant looking through a building's fenestration towards that specific building orientation. Pixels not within these specific view boundaries are given a value of zero. Finally, an average sky brightness (cd/m$^2$) is calculated for each of these zone (pixels values of zero are ignored).

In procedure 226 the HDR radiance map 220 is filtered and masked to isolate clouds from sky using a fixed threshold algorithm for determining fractional sky cover in a way similar to that presented by Long, C. N., J. M. Sabburg, J. Calbo, and D. Pages, 2006: Retrieving cloud characteristics from ground-based daytime color all-sky images. J. Atmos. Oceanic Technol, 23, 633-652. Specifically pixels with a red-to-blue signal ratio (R/B) greater than a predetermined, fixed value are classified as cloud, while lower values of the R/B are classified as cloud-free. Once all cloud/clear pixels have been determined, the fractional sky cover is calculated as the number of cloud pixels divided by the total number of pixels in the HDR radiance map 220 (any border masks surrounding the fish-eye, HDR radiance map 220 are ignored).

In procedure 228 the HDR radiance map 220 is filtered to isolate pixels on the cloud/clear-sky boundaries to determine the cloud edge-to-area ratio. Specifically, the number of pixels on the cloud/clear-sky boundaries are divided by the total number of pixels within all clouds. This value indicates average cloud size and brokenness of cloud coverage. A high edge-to-area ratio is indicative of broken clouds of small diameter, while a smaller ratio results from extended clouds.

In procedure 230 the solar profile angle is calculated for the location, time and date of the HDR radiance map 220 for all building façade orientations. The solar profile angle is derived from the altitude and azimuth angles of the sun's position.

In procedure 232 theoretical, clear sky, solar irradiance and illuminance values are calculated for the building's location at the same time and date as the HDR radiance map 220 on both the horizontal plane and the vertical planes of the building's façades orientations. The algorithms used in these calculations are similar but not specific to the methods described by Perez, R., Ineichen, p. and Seals, R. (1990) Modeling daylight availability and irradiance components from direct and global irradiance. Solar Energy 44, 271-89, hereby expressly incorporated by reference. These theoretical values are then adjusted by factoring them with the calculated value for solar region's measured-pixel/brightest-pixel-achievable ratio from procedure 222. The resultant values are approximations of real-time, solar illuminance and irradiance relative to the current sky conditions. Adding the solar, horizontal illuminance value to the measured value of diffuse horizontal illuminance from procedure 222 gives global horizontal illuminance. A photometer, either attached to or are in close proximity to the environmentally protected enclosure 116, can also be used for directly measuring global horizontal illuminance.

In procedure 234 calculated data from the above procedures are processed into control signals such as may be sent to the building's AF 130, DH 132 and HVAC 134 systems, for example. For the AF 130 system, sky information is quantified (and saved for future calculations) for determining whether clouds are occluding the solar region and, if so, by what amount the direct sun is diffused. When occluded and the HDR map's solar region measured-pixel/brightest-pixel-achievable ratio from procedure 222 is below a predetermined amount, then the values calculated for percent global sky overcast 226, the amount of cloud brokenness 228, the sun's path 230 and the percent cloud content in the direction of movement (determined through comparison with previously saved results) and the sun's path are called. These results are processed and compared against previously saved results for determining how long and, in the case of many broken clouds, how frequently the sun will be occluded. When the calculated period of time or frequency at which the sun will be occluded is above a user-defined threshold, then sky brightness at all fenestration orientations are calculated and compared against a predetermined threshold level for visual glare. Based on these calculated cloud conditions and measured sky brightness readings the AF 130 controls are signaled to respond (e.g. shading systems that would otherwise be drawn or closed to control for direct sun and/or thermal gain are opened at windows not oriented towards a bright sky glare condition). Where electrochromic glass or other phase change glass is used in the AF 130 system, the cloud prediction algorithm signals the AF 130 controls to change the glass's phase or state of tint (to account for the inherent time lag period associated with these changes) in anticipation of forecasted clearing skies and direct sun.

When the sun is determined to be un-occluded by clouds, the vertical solar irradiance (W/m$^2$) on and sky brightness (cd/m$^2$) from all fenestration orientations are calculated and compared against predetermined threshold levels for solar heat gain and visual glare. In addition, current and previously saved results for cloud coverage. Location, brokenness, speed and direction are analyzed for determining if current cloud conditions may occlude the sun within a predetermined period of time relative to the solar path of the sun and the percent cloud content in a direction-speed vector. Based on these measured and calculated results the AF 130 controls are signaled to respond by adjusting the fenestration to predetermined glare control presets or to the profile angle of the sun relative to the fenestration's orientation and user-set depth of direct sun desired to enter the space. Where electrochromic glass is used in the AF 130 system, the cloud prediction algorithm signals the AF 130 controls to change the glass's state of tint (to account for the inherent time-lag associated with these changes in tint level) in anticipation of the advancing clouds and the resultant occluding of the solar region.

For the DH 132 system, measured and calculated data from the above procedures signals the DH 132 system when the measured and calculated daylight values reach a predetermined level to signal a change in electric lighting switching or dimming. The DH 132 system is initially calibrated on-site using handheld photometers for each of the building's floor levels.

For the HVAC 134, calculated values from procedure 232 for vertical, global irradiation on the building's facades orientations are used to determine solar heat gain entering the building. These calculated values inform the HVAC system of current thermal loads as well as projected loads based on the cloud prediction algorithm in procedure 234.

For meteorological system 136 measured and calculated data will be made available in a larger context (multiple devices over a larger geographical area) over the internet or other communications system that will be able to provide a high resolution of sky related phenomena (e.g., cloud cover, solar radiation, and the like) to allow an understanding of that data in real time to allow microclimate prediction. The combination of this data plus readily available meteorological data will allow expert systems to be able to time amounts of radiation, precipitation, cloud movement, and wind conditions at a microclimatic level. A microclimate is a local atmospheric zone where the climate differs from the surrounding area. The term may refer to very small areas, for example a garden bed, or as large as many square miles. Microclimates exist, for example, near bodies of water which may cool the local atmosphere, or in heavily urban areas where brick, concrete, and asphalt absorb the sun's energy, heat up, and reradiate that heat to the ambient air: the resulting urban heat island is a kind of microclimate.

For utility system 138, architecture 210 provides advance information of building performance and energy requirements for a predetermined time in the future. For example, a prediction that in the very near future a noon-time sun will emerge from behind heavy cloud cover (or that the noon-time sun will become occluded by heavy cloud cover), and that this condition may persist for a particular amount of time. Based upon other occupancy, use, and modeling information associated with the building, this advance data allows the utility to quantitatively, in near real-time, understand and respond to energy demand increases/decreases. The scope of this understanding is not limited to the building and its micro-climate, but may be representative of other nearby building energy requirements and expected changes. Of course architecture 210 may include a plurality of systems 110 may be distributed strategically across many buildings and allow the utility to have an even larger aggregate near real-time map of upcoming aggregated energy demand with enough time that the utility may respond appropriately (in increasing output to avoid energy shortage or decreasing output to save costs) among other possible response modalities.

Figure 3:
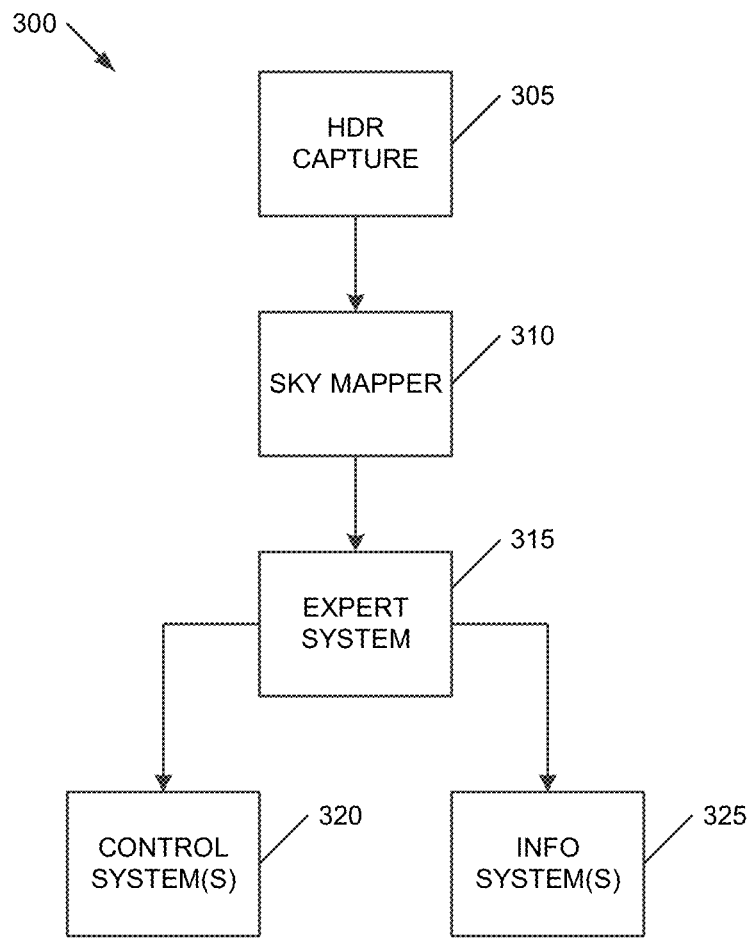
FIG. 3 illustrates a generic environment-informed predictive control system.

FIG. 3 illustrates a generic environment-informed predictive control system 300, of which system 110 is a particular example. System 300 includes an HDR image acquisition subsystem (e.g., HDR capture) 305 that obtains, either through operation of one or more imaging systems as described herein, or use of other suitable data, an HDR image of the sky/local environment. Suitable data varies based upon implementation, but preferably includes near real-time image acquisition sufficient for the desired prediction/forecast window of sky/local environment events.

System 300 also includes a sky mapper 310 that processes the HDR image to extract metrics and characterizations of the sky/local environment. These metrics include elements important to the prediction/forecasting such as, for example, procedures 222-232 shown in FIG. 2. In some implementations, sky mapper 310 may have additional or fewer elements than described herein.

System 300 includes an expert system 315 (also referred to as a learning system) that uses the metrics and characterizations provided by sky mapper 310 in one or more models and predictive systems. These models and predictive systems may be simple or quite complex depending upon the particular use. In some implementations for example, expert system 315 includes a model of a thermal performance of a building in response to various environment loads, operational and lead time requirements for building automation systems 320 (e.g., automated fenestration, daylight harvesting, and HVAC control(s)) or information collection/production 325. In addition, a horizon-to-horizon path of the sun, local buildings and their influence/input into important variables, and other specific information of the building and its operation in the local environment that are important to expert system 315 are used as necessary or desirable. Most preferably expert system 315 is implemented as a learning system to develop and improve prediction and forecasting as it studies how the building and its subsystems react to various parameters it measures and/or calculates.

Control system(s) 320 often benefit from advance input of up-coming sky/local environment events because of lead-time to achieve a desired response. For example, an electrochromic window may take 15 minutes to darken sufficiently in response to a command change. Expert system 315 provides control system 320 for the electrochromic window with advance information enabling it to be in a proper mode in response to a particular event. Expert system 315 informs control system 320 to darken at least 15 minutes before the sun conditions change in any way that would inform its darkness characteristic. In another instance a mechanical cooling system may take some time to alter the thermal sensation of an interior space. Advance warning may allow the system to gently cool the space as it heats up as opposed to trying to remove the heat once the space is warm enough to trigger a thermostat.

Information system(s) 325 aggregate and/or transmit measured/calculated data. Stored information may be used to improve expert system 315 or characterize building or a local micro-climate that includes the building. Transmission of measured/calculated data, particularly in near real-time enables superior energy and lighting management, particularly of the building and other appropriate areas that react similarly to the transmitted data.

Figure 4:
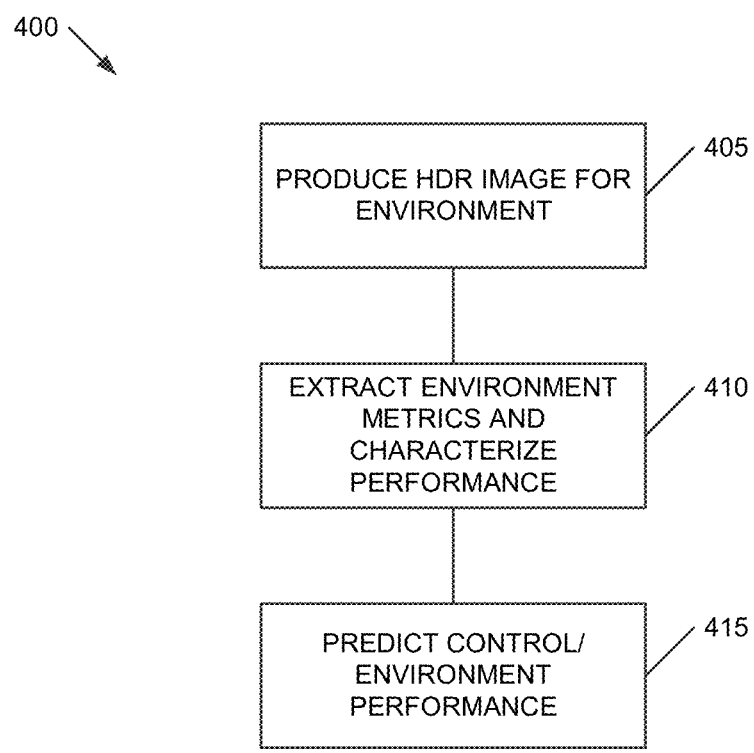
FIG. 4 illustrates a flowchart of a generic environment-informed predictive control process.

FIG. 4 illustrates a flowchart of a generic environment-informed predictive control process 400. Process 400 is preferably implemented by system 110 or 310 or other similar system. Process 400 begins with a step 405 of producing an HDR local environment image (e.g., a series of sets of sky images for a building). After step 405, process 400 extracts environment metrics and characterizes performance of the environment and elements in the environment at step 410. For example, determine where the sun is in the sky, whether there is behind cloud cover, how the cloud cover affects the sunlight with respect to the building, and when the sun will emerge from behind the cloud cover. Process 400 next predicts control requirements and/or environment performance at step 415. While these are often related, they are not always the same as sometimes process works in cooperation with a local control system and other times the predictions/forecasts are used in other ways, some of those ways may be a remote control system.

Figure 5:
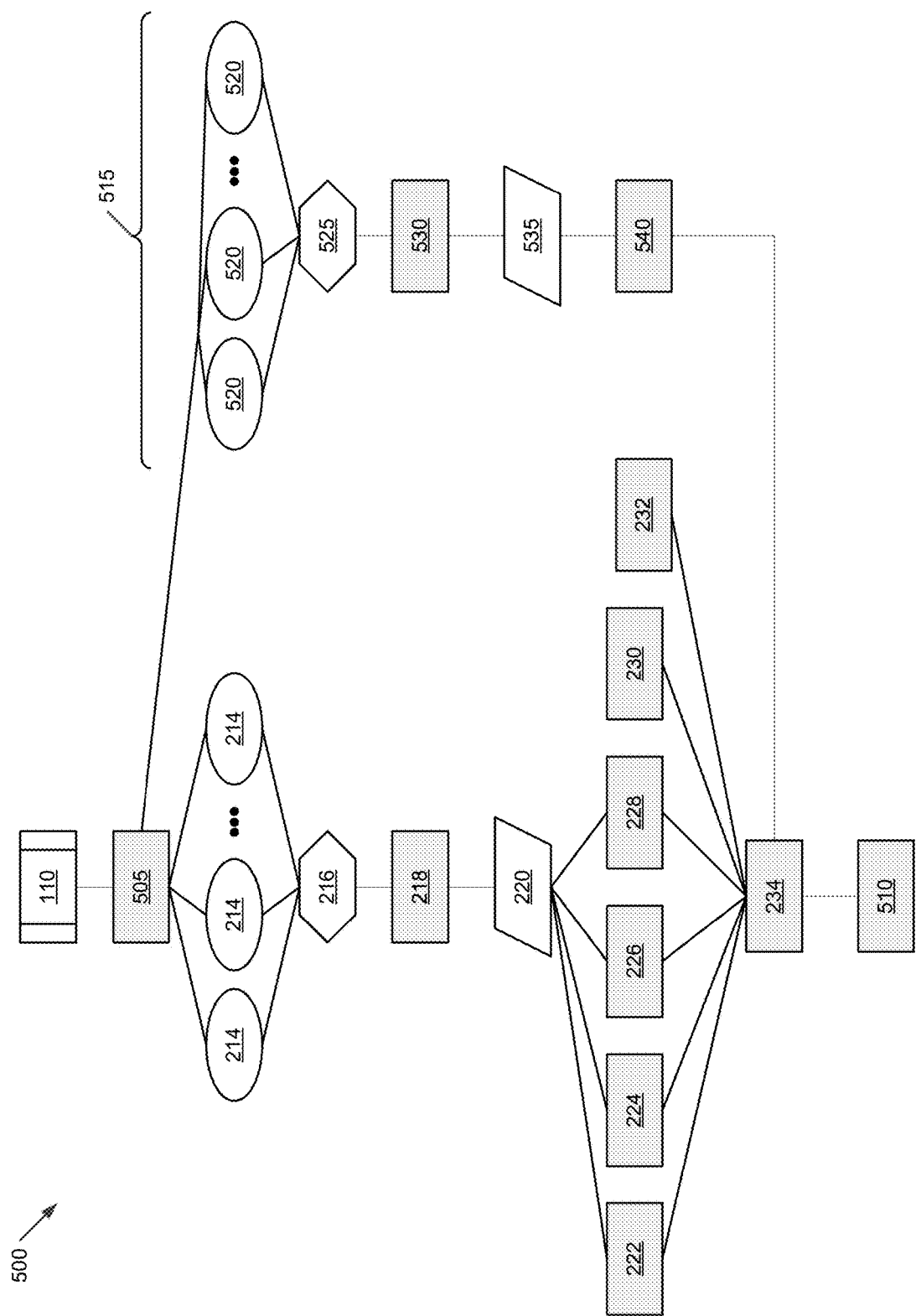
FIG. 5 illustrates an alternative system architecture for determining cloud speed and direction.

FIG. 5 illustrates an alternative system architecture 500 for determining cloud speed and direction. Architecture 500 is modified from architecture 210 illustrated in FIG. 2 to measure cloud speed and direction (i.e., cloud velocity). Architecture 500 is substantially the same as architecture 210 in arrangement and operation except where expressly identified or where it is clear from context. Architecture 500 includes camera control software 505 that is modified from camera control software 212 of architecture 210 for determining cloud velocity. Architecture 500 also includes a set of applications 510 that encompasses controllable building automation systems and other systems 510. Systems 500 include the systems and applications illustrated as elements 130-element 138, and may include other systems and applications in addition.

As further described herein, architecture 500 includes an additional set of elements 515 for determining cloud velocity that is controlled by camera control software 505. After software 505 uses the imager to capture a first set (e.g., five) of LDR images 214, software 505 operates the imager to capture a second set (e.g., three) of LDR images 520. There may be many different ways to determine cloud velocity from the imager and FIG. 5 illustrates one representative methodology.

After a sequence of exposure bracketed, LDR images 214 are acquired from the system 110 by computer 124, second set of LDR images 520 are acquired by camera 112 at a user set interval using an automatic exposure set by the CCS 505. This and other embodiments similar to the one illustrated capture 3 LDR images 520 at two-second intervals using an automatic exposure setting, however more or fewer images can be captured using shorter or faster intervals to meet a user's needs. LDR images 520 are transformed from a hemispherical projection to a planar projection 525 which are then passed through an optical flow analysis routine 530 for calculating cloud speed and direction 535. Using the calculated values of cloud speed and direction 535 a vector of predetermined pixel width is drawn from the known sun position 230 in the last of the LDR image sequences 520 and extended out in time segments in the direction from which the clouds are moving and at a distance based on speed given by 535. This embodiment uses 3, five-minute vector segments of speed to define a total vector distance of fifteen minutes, but longer or shorter time intervals can be chosen by the user. Finally, the percentage of cloud to clear sky pixels within each five-minute vector segment is calculated 540 and used for cloud and solar irradiation forecasting 15 minutes out. This percentage vector overcast of 540 is provided to data processing 234 for use in the systems and applications generally identified in systems 510.

Figure 6:
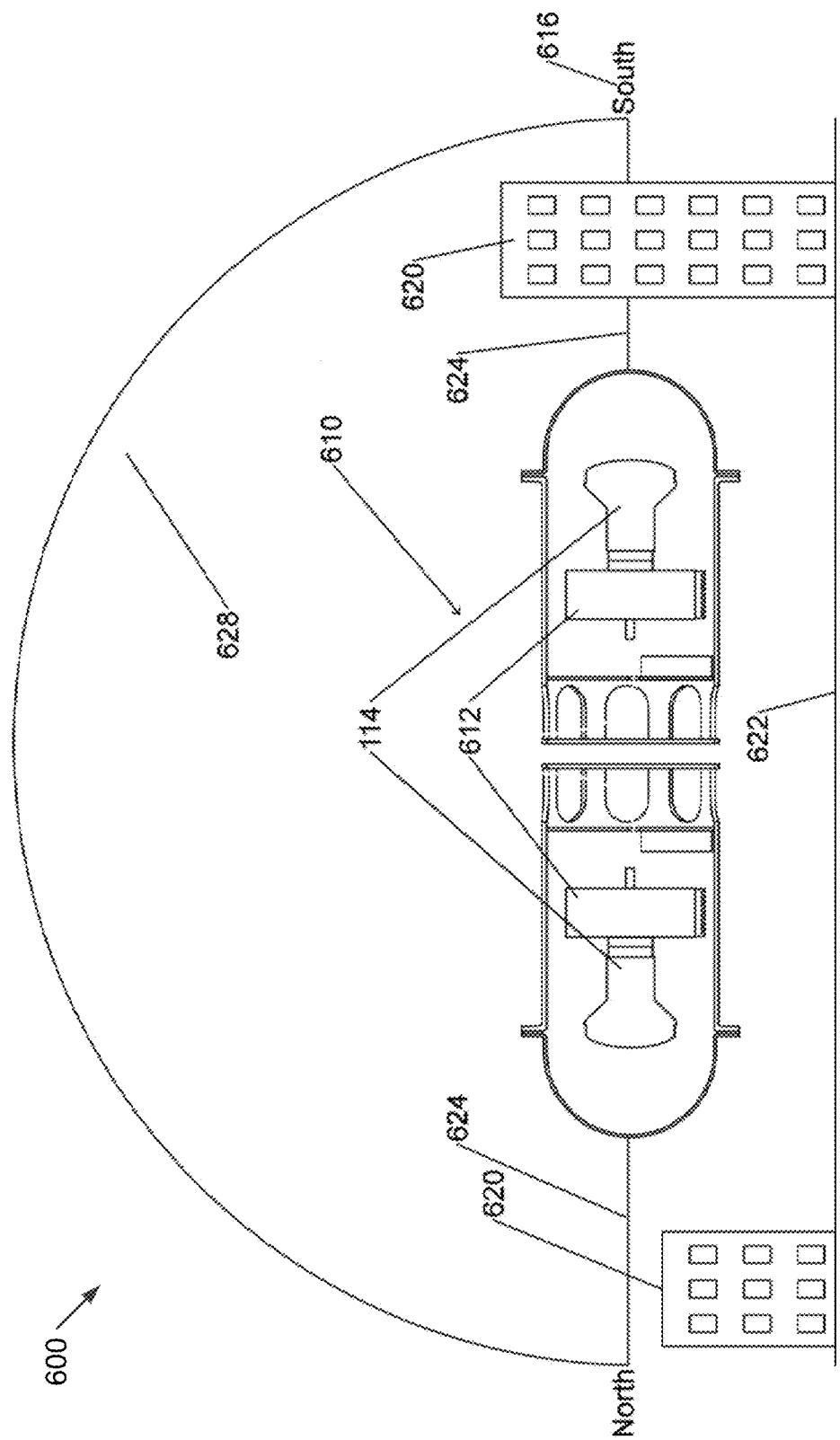
FIG. 6 illustrates an imaging system including two HDR imagers.

FIG. 6 illustrates an imaging system including multiple horizontal HDR imagers (e.g., 2). As illustrated in FIG. 1, and as employed in the architectures of FIG. 2 and FIG. 5, a single vertical HDR imager may be employed to satisfactory result. In some circumstances, performance may be improved by including multiple (e.g., 2, 3, 4, 5, 6, 7, 8, 9, 10, or more) HDR imagers, with at least two being horizontally disposed. A single vertical HDR imager almost exclusively processes the sky vault. In some building automation systems (BAS), significant radiation and illuminance contributions may come from indirect paths other than directly from the sun. Having multiple horizontal imagers that collectively define a spherical field-of-view from a point of interest (e.g., a top of a building) encompasses not only the sky vault but also the ground vault which includes direct and indirect sources that may affect the BAS of a building. Additionally, some rooftops include various obstructions (e.g., a spire or the like) that may degrade performance of some single vertical HDR imager solutions.

A number and an orientation of each HDR imager of system 600 may be influenced by many factors. In some situations, e.g., away from the equator, orienting a pair of imagers into north-south fields-of-view may be advantageous. For installations closer to the equator, there may be an advantage to orienting the pair of imagers with east-west fields-of-view.

Many buildings include four exterior faces that are generally oriented north, east, south, and west. The arrangements of the imagers may be adjusted so that they are positioned at a top of the building at the perimeter with the field-of-view of each individual imager normal to a plane of a face of the building. A typical four-face building may have two or four individual imagers at the top of the building along its perimeter and facing horizontally outward normal to two (or three, or four) faces. A "triangular" building may include three HDR imagers, a "Pentagon" may include five individual imagers, and so on for different numbers of faces of buildings.

In system 210 of FIG. 2, camera control software 212 is modified to actuate each individual imager (preferably concurrently with other imagers of any particular imaging solution but time-staggered may be sufficient in some cases) to capture the desired number of LDR images 214. For a dual-imager solution, system 210 initially captures 10 individual LDR images 214 which includes 5 pairs of LDR images. Similarly, a triple-imager solution produces 15 individual LDR images 214 which includes 5 triplets of LDR imagers. System 210 merges the pairs (or the triplets) or the individual concurrent LDR image from each individual imager's contribution from the multiple imagers of the HDR imaging solution. At each exposure time, system 210 creates one, single LDR image providing a 360 degree horizontal and vertical, spherical, radiance map of the complete, local environment. The HDR radiance map is then constructed from these single LDR images as described herein.

With respect to system 500 illustrated in FIG. 5, not only may there be multiple LDR 214 images at each exposure time, there may be multiple LDR 520 images at each exposure time. In each case when there are multiple images from one exposure time, system 500 may combine the multiple LDR images to provide a single 360 degree horizontal and vertical, spherical, radiance map of the complete, local environment. Processing then may proceed using the enhanced LDR images.

System 600 may include multiple, interchangeable cameras 612 and lenses 614 (not to scale in FIG. 6) that are employed and positioned horizontally to face specific building façade orientations 616. Each camera within this system 610 captures an orientation specific, 360-degree azimuthal view and 180-degree or more hemispherical view, HDR image of the sky 628 as well as the local site 620 and ground conditions 622 above and below the horizon 624. The acquired HDR images can be combined into one, single image providing a 360 degree horizontal and vertical, spherical, radiance map of the complete, local environment.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus comprising:
    a high dynamic range (HDR) capturer comprising one or more cameras to capture a plurality of low dynamic range (LDR) images of a sky, the HDR capturer to generate, using the plurality of LDR images, one or more HDR images of the sky; and
    a processing device, communicatively coupled to the HDR capturer, the processing device to:
        process the one or more HDR images of the sky to obtain a radiance map of a 360-degree horizontal and vertical radiance map of the sky, wherein the radiance map comprises information about radiance associated with a region of the sky;
        determine, using the radiance map, a plurality of metrics characterizing a distribution of clouds in the sky;
        obtain, using the plurality of metrics, an estimate of a change of the distribution of clouds within a pre-determined period of time;
        generate, based on the estimate, settings for one or more environmental control systems (ECS) of a building; and
        apply the settings to control the one or more ECS, wherein the one or more ECS comprise at least one of an automated fenestration system (AFS), an electric lighting system (ELS), or a heating, ventilation, and air conditioning (HVAC) system.

2. The apparatus of claim 1, wherein the one or more HDR images of the sky comprise a first image of the sky at a first instance of time and a second HDR image of the sky at a second instance of time, and wherein the plurality of metrics comprises speed and direction of a cloud motion at each of a plurality of cloud locations.

3. The apparatus of claim 1, wherein to generate the one or more HDR images of the sky, the processing device is to:
    discard a first LDR image whose average pixel brightness is below a threshold value; and
    process a second LDR image whose average pixel brightness is at or above the threshold value.

4. The apparatus of claim 1, wherein to determine the plurality of metrics characterizing the distribution of clouds in the sky, the processing device is to:
    determine a red-to-blue signal ratio for a plurality of pixels of the one or more HDR images of the sky;
    identify pixels having the red-to-blue signal ratio below a threshold value as pixels corresponding to a clear sky; and
    identify pixels having the red-to-blue signal ratio above the threshold value as pixels corresponding to the clouds.

5. The apparatus of claim 1, wherein to determine the plurality of metrics characterizing the distribution of clouds in the sky, the processing device is to:
    identify a first set of pixels of the one or more HDR images of the sky as pixels corresponding to the clouds;

identify a second set of pixels of the one or more HDR images of the sky as pixels corresponding to a boundary between a clear sky and the clouds; and determine an edge-to-area ratio of a number of pixels in the second set of pixels to a number of pixels in the first set of pixels.

6. The apparatus of claim 1, wherein the radiance map comprises a plurality of patches within a sky hemisphere.

7. The apparatus of claim 1, wherein the generated settings are further based on a sun's path within the pre-determined period of time.

8. The apparatus of claim 1, wherein the pre-determined period of time is associated with a time-lag of the one or more ECS of the building.

9. The apparatus of claim 1, wherein the processing device is further to predict that a sun's occlusion within the pre-determined period of time is above a pre-set threshold value, and wherein the settings for the one or more ECS of the building comprises a setting for the AFS to keep shading systems open.

10. The apparatus of claim 9, wherein the shading systems of the AFS comprise electrochromic glass, and wherein the setting for the AFS to keep the shading systems open comprises a setting that decreases a state of tint of the electrochromic glass.

11. The apparatus of claim 1, wherein the processing device is further to predict that a sun's occlusion within the pre-determined period of time is below a pre-set threshold value, and wherein the settings for the one or more ECS of the building comprises a setting for the AFS placing the AFS in a pre-set glare control state.

12. The apparatus of claim 11, wherein the AFS comprises electrochromic glass, and wherein the pre-set glare control state of the AFS comprises a pre-determined state of tint of the electrochromic glass.

13. The apparatus of claim 1, wherein the one or more HDR images comprise a first set of images and a second set of HDR images, the second set of images being captured after a pre-determined time has elapsed since the first set of HDR images was captured.

14. The apparatus of claim 6, wherein the plurality of metrics characterizing the distribution of clouds in the sky is determined using a first subplurality of patches of the plurality of patches, the first subplurality of patches being within a part of the sky visible, through a first building façade of the building, to an occupant of the building.

15. A method comprising:
capturing, by one or more cameras of a high dynamic range (HDR) capturer, a plurality of low dynamic range (LDR) images of a sky;
generating, by the HDR capturer, one or more HDR images of the sky, wherein the one or more HDR images of the sky are generated using the plurality of LDR images;
processing, by a processing device communicatively coupled to the HDR capturer, the one or more images of the sky to obtain a radiance map of a 360-degree horizontal and vertical radiance map of the sky, wherein the radiance map comprises information about radiance associated with a region of the sky;

determining, by the processing device, using the radiance map, a plurality of metrics characterizing a distribution of clouds in the sky;
estimating, by the processing device, using the plurality of metrics, whether the distribution of clouds is to change within a pre-determined period of time;
generating, by the processing device, based on the estimating, settings for one or more environmental control systems (ECS) of a building; and
applying the settings to control the one or more ECS, wherein the one or more ECS comprise at least one of an automated fenestration system (AFS), an electric lighting system (ELS), or a heating, ventilation, and air conditioning (HVAC) system.

16. The method of claim 15, wherein the one or more HDR images of the sky comprise a first HDR image of the sky at a first instance of time and a second HDR image of the sky at a second instance of time, and wherein the plurality of metrics comprises speed and direction of a cloud motion at each of a plurality of cloud locations.

17. The method of claim 15, wherein generating the one or HDR more images of the sky comprises:
discarding a first LDR image whose average pixel brightness is below a threshold value; and
processing a second LDR image whose average pixel brightness is at or above the threshold value.

18. The method of claim 15, wherein determining the plurality of metrics characterizing the distribution of clouds in the sky comprises:
determining a red-to-blue signal ratio for a plurality of pixels of the one or more HDR images of the sky;
identifying pixels having the red-to-blue signal ratio below a threshold value as pixels corresponding to a clear sky; and
identifying pixels having the red-to-blue signal ratio above the threshold value as pixels corresponding to the clouds.

19. A non-transitory machine-readable storage medium including instructions that, when accessed by a processing device, cause the processing device to:
generate, using a plurality of LDR images of a sky captured by one or more cameras of an HDR capturer, one or more HDR images of the sky;
process the one or more HDR images of a sky to obtain a radiance map of a 360-degree horizontal and vertical radiance map of the sky, wherein the radiance map comprises information about radiance associated with a region of the sky;
determine, using the radiance map, a plurality of metrics characterizing a distribution of clouds in the sky;
obtain, using the plurality of metrics, an estimate of a change of the distribution of clouds within a pre-determined period of time;
generate, based on the estimate, settings for one or more environmental control systems (ECS) of a building; and
apply the settings to control the one or more ECS, wherein the one or more ECS comprise at least one of an automated fenestration system (AFS), an electric lighting system (ELS), or a heating, ventilation, and air conditioning (HVAC) system.

* * * * *